United States Patent
Kino et al.

(10) Patent No.: US 6,760,180 B2
(45) Date of Patent: Jul. 6, 2004

(54) SERVO TRACK WRITER AND DRIVING METHOD THEREFOR

(75) Inventors: Seiji Kino, Kawasaki (JP); Hirofumi Ohsawa, Kawasaki (JP); Yukio Ozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 317 days.

(21) Appl. No.: 09/945,442

(22) Filed: Aug. 30, 2001

(65) Prior Publication Data

US 2002/0145819 A1 Oct. 10, 2002

(30) Foreign Application Priority Data

Apr. 10, 2001 (JP) ........................................ 2001-111714

(51) Int. Cl.[7] .......................... G11B 21/02; G11B 5/596
(52) U.S. Cl. ...................................... 360/75; 360/78.04
(58) Field of Search ............................ 360/75, 78.04, 360/77.01, 77.02, 78.01, 78.05

(56) References Cited

U.S. PATENT DOCUMENTS

| | | | | |
|---|---|---|---|---|
| 5,315,372 A | * | 5/1994 | Tsai ............................ | 356/510 |
| 5,610,777 A | * | 3/1997 | Dang et al. .............. | 360/77.03 |
| 5,774,294 A | * | 6/1998 | Fioravanti ..................... | 360/75 |
| 5,796,542 A | * | 8/1998 | Szeremeta ................ | 360/77.02 |
| 6,151,185 A | * | 11/2000 | Ishizuka et al. .......... | 360/78.04 |

FOREIGN PATENT DOCUMENTS

| | | |
|---|---|---|
| JP | 07-220422 | 8/1995 |
| JP | 07-254245 | 10/1995 |
| JP | 09-213034 | 8/1997 |
| JP | 09-251739 | 9/1997 |
| JP | 10-134533 | 5/1998 |

* cited by examiner

*Primary Examiner*—David Hudspeth
*Assistant Examiner*—Jason Olson
(74) *Attorney, Agent, or Firm*—Greer, Burns & Crain, Ltd.

(57) ABSTRACT

A servo track writer for writing a servo track signal to a disk medium in a disk drive including the disk medium, a head for reading/writing information from/to the disk medium, and an internal actuator for moving the head across tracks formed on the disk medium. The internal actuator has a rotatable carriage for supporting the head. The servo track writer includes an external actuator having an arm, a solid deformation element provided in relation to the arm, and an effector mounted on the arm; an internal actuator control unit for controlling the internal actuator; an external actuator control unit for controlling the external actuator; a solid deformation element control unit for controlling the solid deformation element; and an arm position detecting device for detecting a position of the arm. The solid deformation element is divided into a first segment functioning as an actuator for minutely displacing the carriage, and a second segment functioning as a sensor for detecting a position of the effector.

13 Claims, 17 Drawing Sheets

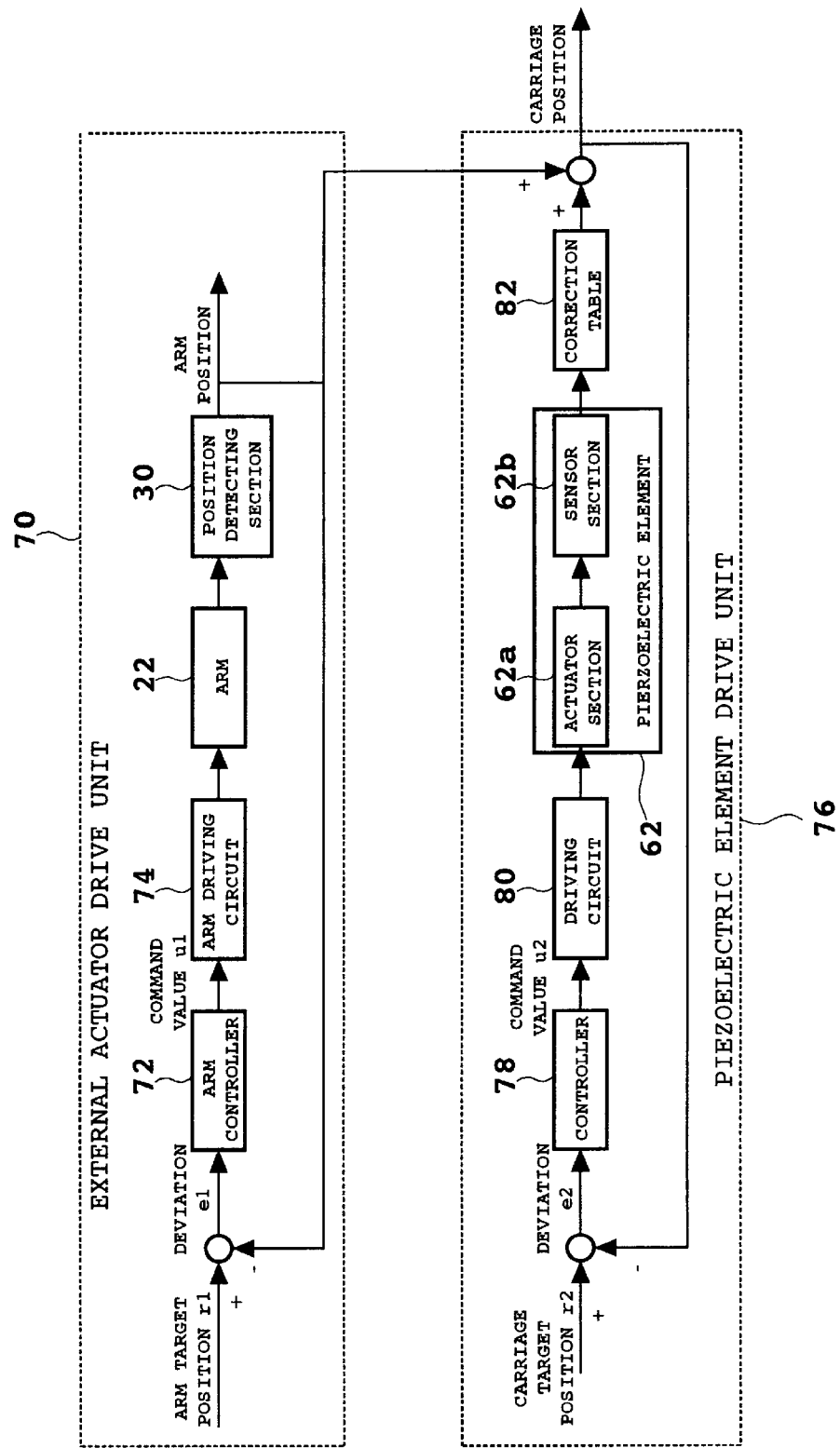

SERVO TRACK WRITER AND DRIVING METHOD THEREFOR

BACKGROUND OF THE INVENTION

1. Field of the Invention

The present invention relates to a servo track writer (STW) for writing a servo track signal to a disk medium in a magnetic disk drive, and also to a driving method for the servo track writer.

2. Description of the Related Art

With a reduction in size and an increase in recording density of a recent magnetic disk drive, a track pitch has been rapidly decreased and it is required to position a head with a high accuracy on the order of nanometers in writing a servo track signal to a disk medium. To meet this requirement, an improvement in head positioning accuracy is being pursued by increasing the accuracy of a position sensor and the rigidity of a drive motor. In the drive motor having a sliding portion, however, the effects of minute play and nonlinearity increase. It is therefore necessary to reduce or remove the effects generated from the drive motor itself and also to reduce the effect due to disturbance vibrations.

A servo track writer is a device for writing a servo track signal as a reference signal for use in positioning of a head in a magnetic disk drive to a disk medium. The servo track signal is written in the form of concentric circles at a submicron pitch. In the condition that no signal has yet been written on the disk medium and that a mechanical portion of the magnetic disk drive has been assembled, the disk drive is set on the servo track writer. An actuator (external actuator) of the servo track writer is operated to make an internal actuator of the magnetic disk drive follow, thereby positioning the head relative to the disk medium. In this condition, the servo track signal is written on the disk medium. Accordingly, the positioning accuracy of the external actuator in the servo track writer has a great effect on a servo track signal writing quality which determines the performance of the magnetic disk drive.

In a conventional servo track writer (STW), a voice coil motor (VCM) or a servo motor is used as a driving portion of the external actuator, and a rigid pin (push pin) is mounted on the front end of an arm fixed to an output shaft of the motor. The positioning of the head relative to the disk medium is carried out by placing the push pin in contact with a carriage (actuator arm) of the magnetic disk drive, applying a bias current to the internal actuator of the magnetic disk drive to press the carriage against the push pin, detecting a position of the arm of the STW, and feedback controlling the driving portion of the external actuator.

In recent years, a noncontact type STW and a driving method therefor have also been proposed. The noncontact type STW has a light emitting element and a photodetecting element both mounted on the arm of the STW, in place of the above-mentioned rigid pin. In this connection, a target is provided on the carriage of the magnetic disk drive. The head positioning is carried out by directing light from the light emitting element onto the target, receiving the light reflected on the target with the photodetecting element to thereby detect a relative displacement between the arm of the STW and the carriage of the magnetic disk drive, and controlling the driving of the internal actuator of the magnetic disk drive so as to cancel this relative displacement.

However, in the external actuator of the conventional STW, a ball bearing is used as a bearing at the driving portion. The ball bearing necessarily has minute play, causing a reduction in positioning accuracy. If a preload applied to the ball bearing is increased to reduce the play, friction torque increases to cause a deterioration in steady-state error or a reduction in responsiveness. Further, in a region where the amount of rotational movement is very small, the ball bearing exhibits a composite behavior inclusive of rolling, sliding, and elastic deformation. Accordingly, high nonlinearity and discontinuity appear in a control system, and stability cannot be ensured more as the control accuracy is tried to become higher.

In the case that a hydrostatic air bearing is used as the bearing in the external actuator, the problem of friction can be solved. In this case, however, the actuator itself becomes large in size, so that it cannot be applied to a small-sized magnetic disk drive and its associated servo track writer. Moreover, the rigidity of the bearing is reduced to cause a reduction in accuracy or vibration resistance characteristics due to elastic displacement.

A further problem is that the magnetic disk drive itself becomes a vibration source because of rotation of the disk medium, inducing vibrations of the carriage and a suspension in the magnetic disk drive. The external actuator of the conventional STW does not include any means for controlling and suppressing the vibrations of the carriage and the suspension, resulting in vibrations of the head to deteriorate the servo track signal writing quality. To improve the vibration resistance characteristics, increasing the inertia of the external actuator is desirable. However, an increase in tact time due to a reduction in responsiveness is invited, and the increase in inertia also causes a hindrance to a size reduction of the STW.

A still further problem is that when the natural vibration frequency of the internal actuator of the magnetic disk drive becomes equal to an integral multiple of the rotational speed of the disk medium, large vibrations due to resonance occur to deteriorate the servo track signal writing quality. In the conventional STW, the rotational speed of the disk medium is reduced in writing a servo track signal, thereby avoiding the occurrence of resonance.

However, the recent magnetic disk drive is of a contact start stop (CSS) type such that an air flow is generated by the rotation of the disk medium to act on a head slider and the head slider is kept flying by the balance of a positive pressure and a negative pressure owing to the air flow. Accordingly, an adjustable range of the rotational speed of the disk medium is narrow, and there is a case that the adjustment of the rotational speed may be impossible depending on the kinds of the disk drive. If the rotational speed of the disk medium is lowered to reduce the resonance, the time required for writing of a servo track signal becomes long, resulting in a hindrance to the productivity of the magnetic disk drive.

SUMMARY OF THE INVENTION

It is therefore an object of the present invention to provide a servo track writer and a driving method therefor which can improve a head positioning accuracy and positioning response speed in a disk drive.

It is another object of the present invention to provide a servo track writer and a driving method therefor which can reduce the vibrations of the internal actuator in the disk drive due to a disturbance and vibrations generated in the disk drive itself.

It is a further object of the present invention to provide a servo track writer and a driving method therefor which can adjust the resonant frequency of the internal actuator without changing the rotational speed of a disk medium, thereby reducing the resonance of the internal actuator depending on the rotational speed of the disk medium.

In accordance with an aspect of the present invention, there is provided a servo track writer for writing a servo track signal to a disk medium in a disk drive including said disk medium, a head for reading/writing information from/to said disk medium, and an internal actuator for moving said head across tracks formed on said disk medium, said internal actuator having a rotatable carriage for supporting said head, said servo track writer comprising an external actuator having an arm having substantially the same rotational axis as that of said carriage, a drive unit for rotating said arm, a solid deformation element provided in relation to said arm, and an effector mounted on said arm and adapted to come into contact with said carriage; an internal actuator control unit for controlling said internal actuator; an external actuator control unit for controlling said external actuator; a solid deformation element control unit for controlling said solid deformation element; and an arm position detecting device for detecting a position of said arm; said solid deformation element being divided into at least a first segment and a second segment, said first segment functioning as an actuator for minutely displacing said carriage, said second segment functioning as a sensor for detecting a position of said effector.

Preferably, said solid deformation element is selected from the group consisting of a piezoelectric element, piezoelectric resin, composite piezoelectric element, magnetostrictive element, and electrostrictive element. Preferably, said effector is configured by said solid deformation element. As modifications, said solid deformation element is interposed between said arm and said effector, or at least a part of said arm is configured by said solid deformation element.

Preferably, said solid deformation element comprises a tubular stack type solid deformation element divided into a plurality of first segments and a plurality of second segments alternately arranged in the circumferential direction, where said first segments function as an actuator, and said second segments function as a sensor. Alternatively, said solid deformation element comprises a platelike shear type solid deformation element having a polarization direction along the thickness thereof and divided into a pair of first segments and a second segment interposed between said pair of first segments, wherein said first segments function as an actuator, and said second segment functions as a sensor.

In accordance with another aspect of the present invention, there is provided a driving method for a servo track writer having an arm having substantially the same rotational axis as that of a carriage in a disk drive, a drive unit for rotating said arm, a solid deformation element provided in relation to said arm, and an effector mounted on said arm and adapted to come into contact with said carriage, said driving method comprising the steps of driving said carriage so that said carriage and said effector come into contact with each other; inputting an arm target position command to rotate said arm; detecting a position of said arm; feedback controlling the rotation of said arm so that said detected position of said arm coincides with an arm target position; inputting a carriage target position command to drive a first part of said solid deformation element and to minutely move said carriage through said effector; detecting a relative position of said effector to said arm by using a second part of said solid deformation element; detecting a position of said carriage according to said detected position of said arm and said detected relative position of said effector; and feedback controlling the driving of said first part of said solid deformation element so that said detected position of said carriage coincides with a carriage target position.

In this method, said arm is rotated so that said effector describes a spiral locus relative to a disk medium rotating at a constant speed; and said solid deformation element drives said effector so that said carriage describes a circular locus at each servo track position on said disk medium in synchronism with said spiral locus. Preferably, said driving method further comprises the steps of detecting vibrations of said carriage by using said second part of said solid deformation element; and driving said first part of said solid deformation element in a direction of canceling said detected vibrations of said carriage. As a modification, said driving method further comprises the steps of accumulating vibrations of said carriage as electric charge in said second part of said solid deformation element; and supplying said electric charge to a resonant circuit connected to said second part of said solid deformation element to consume said electric charge as Joule heat.

As another modification, said carriage is driven so that a contact force between said carriage and said effector is maintained constant, thereby reducing vibrations generated in said carriage. Preferably, said driving method further comprises the step of changing the contact force between said carriage and said effector to thereby change a resonant frequency of said carriage, thereby suppressing the resonance of said carriage.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 12 is a block diagram showing a servo track writer driving circuit according to a preferred embodiment of the present invention;

DETAILED DESCRIPTION OF THE PREFERRED EMBODIMENTS

Figure 1:
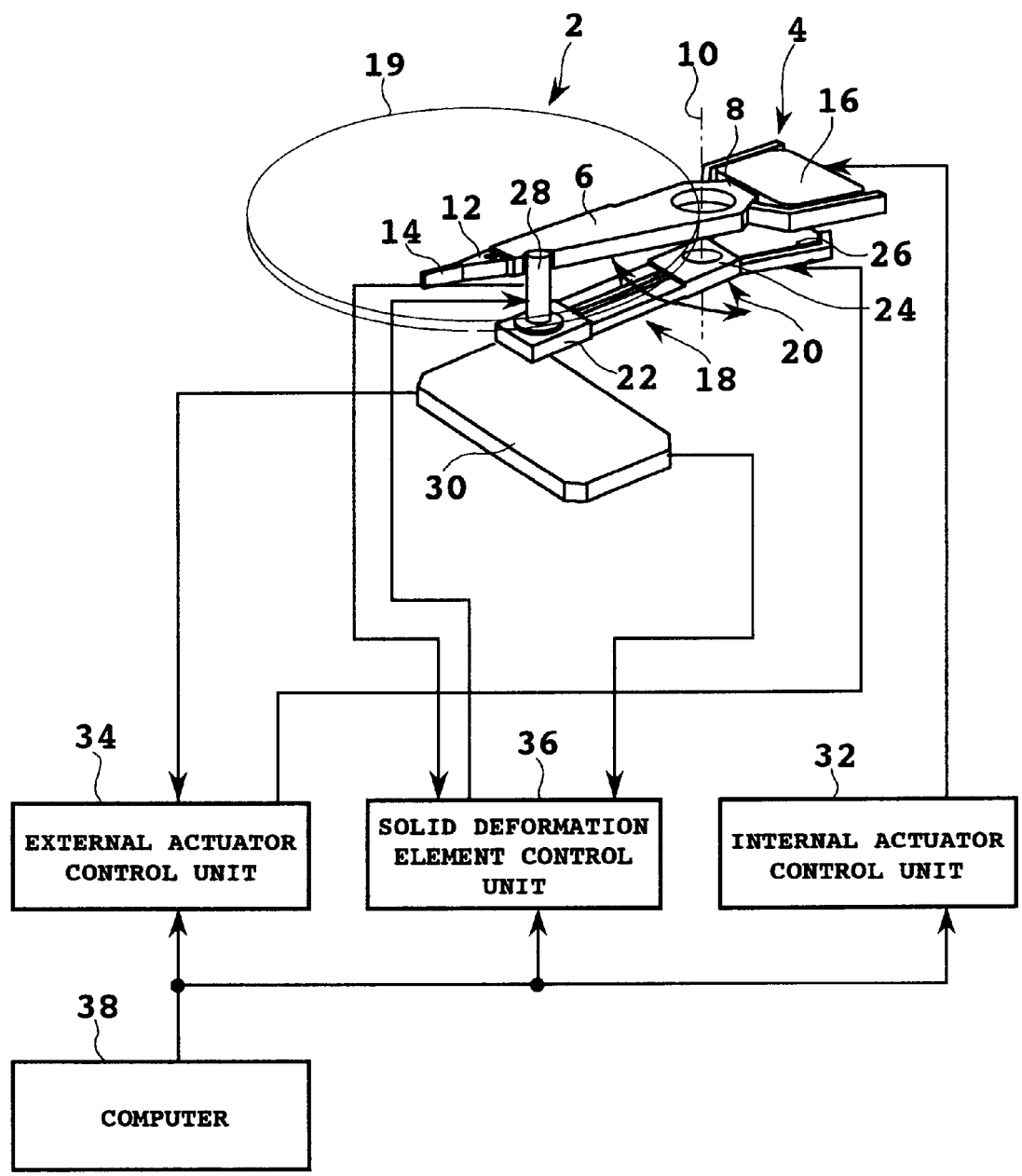
FIG. 1 is a block diagram showing the principle of the present invention.

The configuration of the present invention will now be described with reference to FIG. 1 showing the principle of a magnetic disk drive 2 according to the present invention. The magnetic disk drive 2 includes an internal actuator 4. The internal actuator 4 has a carriage (actuator arm) 6 rotatable about a rotational axis 10 through a bearing 8. A suspension 12 is fixed to the front end of the carriage 6, and a magnetic head 14 is mounted on the front end of the suspension 12. The internal actuator 4 is swung about the rotational axis 10 by a drive unit 16 such as a voice coil motor (VCM). Accordingly, the magnetic head 14 is moved in the radial direction of a disk medium 19.

Reference numeral 18 generally denotes a servo track writer (STW). The servo track writer 18 has an external actuator 20. The external actuator 20 has an arm 22 rotatably driven about the rotational axis 10 through a bearing 24 by a drive unit 26 such as a VCM. An effector 28 configured by a solid deformation element is fixed to the front end of the arm 22. The position of the front end of the arm 22 is detected by an arm position detecting device 30 such as a laser encoder. The internal actuator 4 is controlled by an internal actuator control unit 32. A detection signal from the arm position detecting device 30 is input to an external actuator control unit 34, and the external actuator 20 is controlled by the external actuator control unit 34 according to the input detection signal.

The arm position signal output from the arm position detecting device 30 and a signal output from a sensor section of the effector 28 are input to a solid deformation element control unit 36, and an actuator section of the effector 28 is driven by the solid deformation element control unit 36 according to these input signals. All of the internal actuator control unit 32, the external actuator control unit 34, and the solid deformation element control unit 36 are connected to a computer 38, and controlled by the computer 38. The effector 28 of the solid deformation element is divided into at least a first segment and a second segment. The first segment functions as an actuator for minutely displacing the carriage 6, and the second segment functions as a sensor for detecting a position of the effector 28.

In writing a servo track signal, the carriage 6 of the internal actuator 4 is placed so as to come into contact with the effector 28, and a bias current is applied to the drive unit 16 of the internal actuator 4 to press the carriage 6 against the effector 28. A target position of the arm 22 is input from the computer 38 to the external actuator control unit 34, and the arm 22 is rotationally driven by the drive unit 26 according to this target position of the arm 22. The front end position of the arm 22 is detected by the arm position detecting device 30, and the drive unit 26 is feedback controlled so that the detected front end position of the arm 22 comes into coincidence with the above target position of the arm 22.

The effector 28 of the solid deformation element fixed to the front end of the arm 22 operates both as an actuator for minutely moving the carriage 6 of the internal actuator 4 and as a sensor for detecting a position of the carriage 6. A target position of the carriage 6 is input from the computer 38 to the solid deformation element control unit 36, and the actuator section of the effector 28 is driven by the solid deformation element control unit 36 to minutely move the carriage 6.

The position of the carriage 6 is detected by the sensor section of the effector 28, and a detection signal from the sensor section is fed back to the solid deformation element control unit 36. The actuator section of the effector 28 is controlled by the solid deformation element control unit 36 so that the position of the carriage 6 detected by the sensor section of the effector 28 comes into coincidence with the above target position of the carriage 6. Accordingly, the magnetic head 14 is precisely positioned on a target track of the disk medium 19, and a servo track signal is supplied to the magnetic head 14 from a servo track signal writing circuit 21 (see FIG. 2) connected to the magnetic disk drive 2, thereby making the magnetic head 14 to write the servo track signal on the target track.

Figure 2:
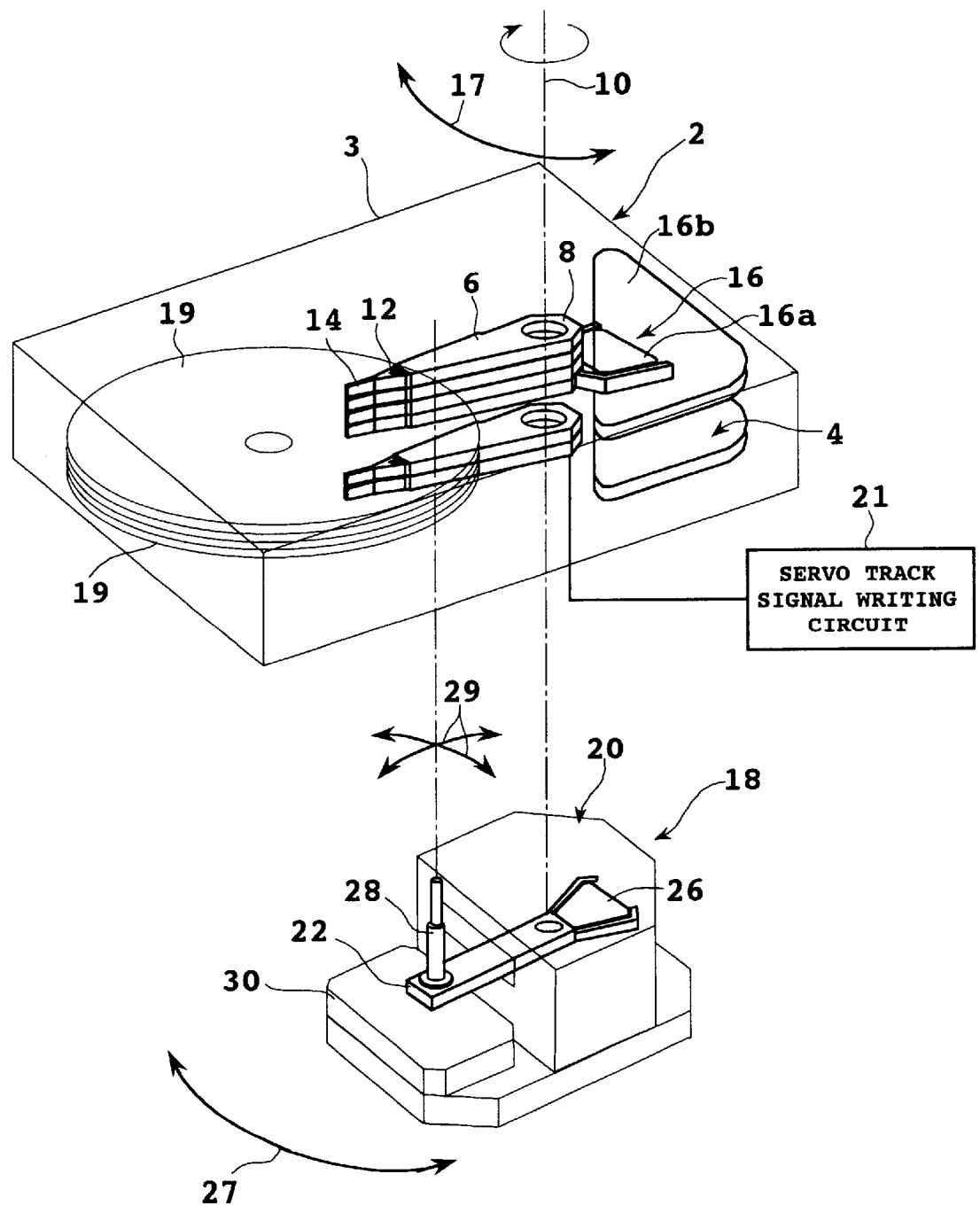
FIG. 2 is a perspective view showing a schematic configuration of a preferred embodiment of the present invention.

Referring to FIG. 2, there is shown a schematic configuration of a preferred embodiment of the present invention, which more specifically illustrates the principle shown in FIG. 1. In FIG. 2, the same parts as those shown in FIG. 1 are denoted by the same reference numerals. A plurality of disk media 19 are accommodated in a housing (enclosure) 3 of the magnetic disk drive 2 so as to be rotatable by a spindle motor (not shown). The drive unit 16 of the internal actuator 4 of the magnetic disk drive 2 is configured by a VCM, and includes a coil 16a mounted on the carriage 6 and a magnetic circuit 16b fixed to the housing 3. The internal actuator 4 is rotatably driven in a direction of arrow 17 by the drive unit 16.

The servo track writer 18 is placed under the magnetic disk drive 2 so that the effector 28 comes into contact with the carriage 6. The drive unit 26 of the external actuator 20 of the servo track writer 18 is also configured by a VCM, and rotates the arm 22 about the rotational axis 10 in a direction of arrow 27. The effector 28 fixed to the front end of the arm 22 is configured by a solid deformation element such as a piezoelectric element. Other examples of the solid deformation element that can be adopted as the effector 28 include a piezoelectric resin, composite piezoelectric element, magnetostrictive element, and electrostrictive element.

The effector 28 of the solid deformation element is composed of a plurality of first segments and a plurality of second segments. The effector 28 is cylindrical, and these first and second segments are alternately arranged in the circumferential direction of the effector 28. The first segments function as an actuator, and the second segments function as a sensor. The effector 28 is driven in directions of arrows 29 to minutely move the carriage 6 of the magnetic disk drive 2.

Figure 3:
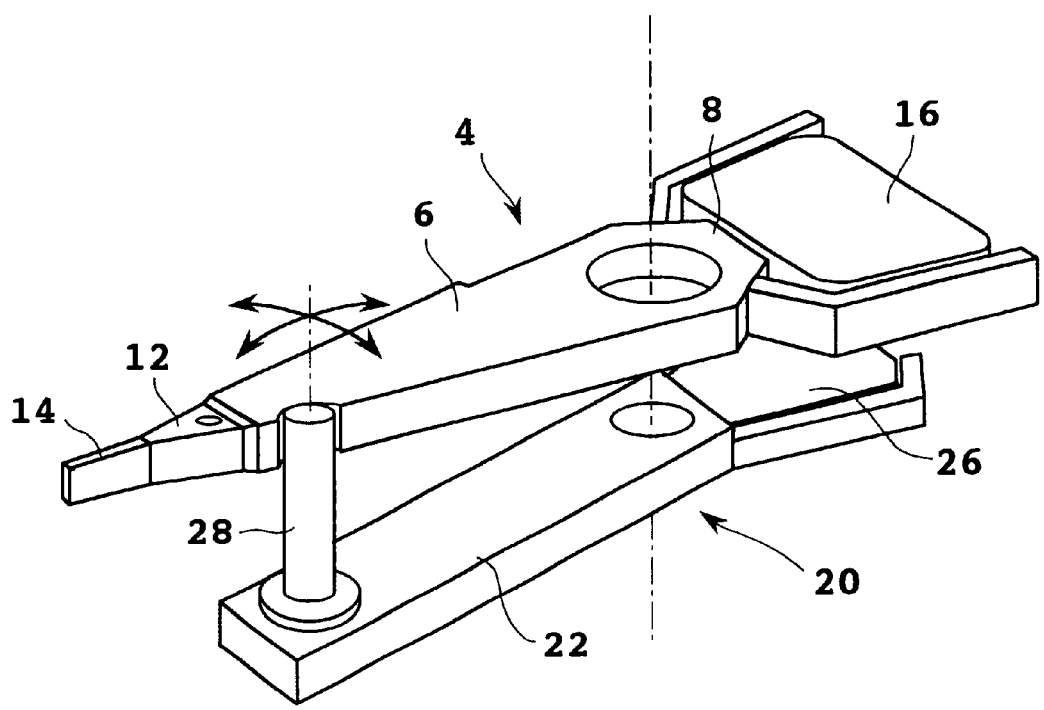
FIG. 3 is a perspective view showing a preferred embodiment of the arrangement of a solid deformation element according to the present invention.

FIG. 3 shows a preferred embodiment of the arrangement of the solid deformation element. In this preferred embodiment, the effector 28 is configured by a solid deformation element as in the preferred embodiment shown in FIG. 2, and is placed in contact with the carriage 6.

Figure 4:
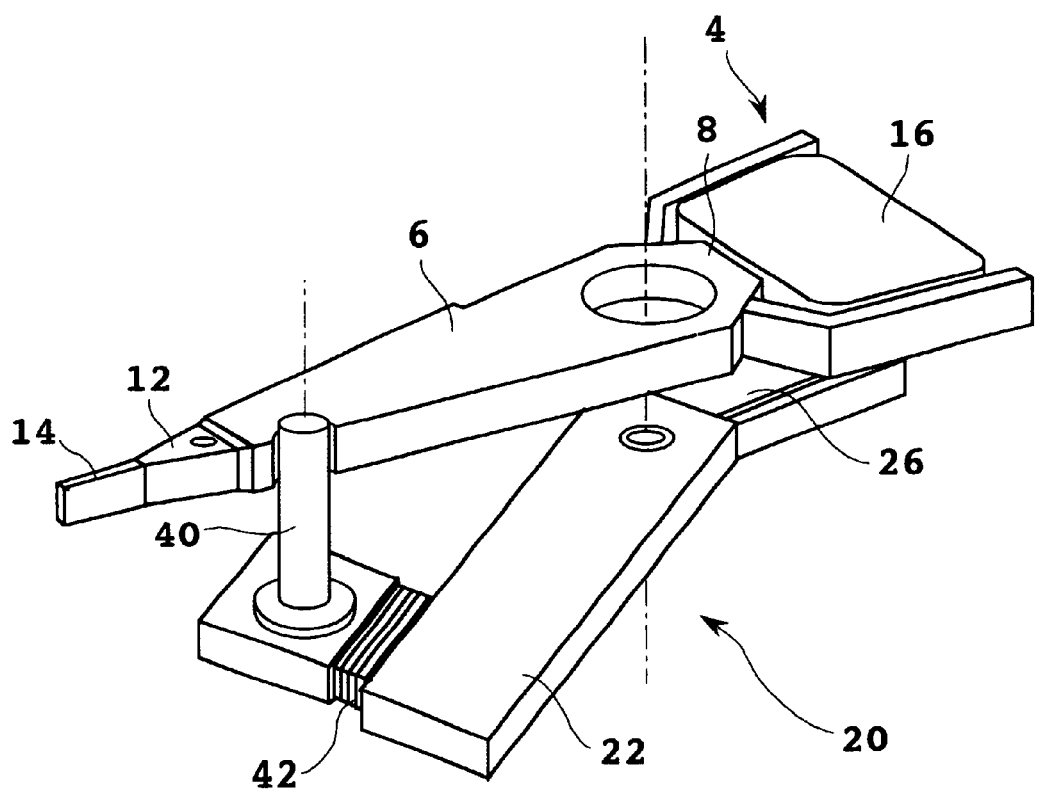
FIG. 4 is a perspective view showing another preferred embodiment of the arrangement of the solid deformation element.

FIG. 4 shows another preferred embodiment of the arrangement of the solid deformation element. In this preferred embodiment, a solid deformation element 42 is interposed between the arm 22 of the external actuator 20 and an effector 40.

Figure 5:
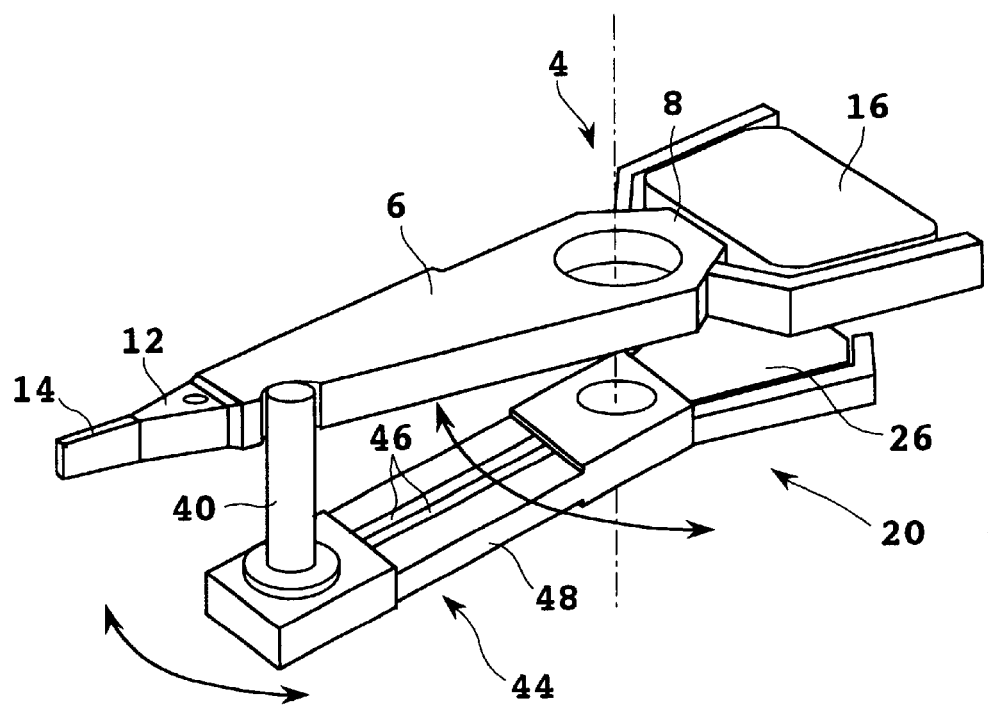
FIG. 5 is a perspective view showing a further preferred embodiment of the arrangement of the solid deformation element.

FIG. 5 shows a further preferred embodiment of the arrangement of the solid deformation element. In this preferred embodiment, the external actuator 20 has an arm 44 composed of a solid deformation element 46 and a reinforcing member 48. The reinforcing member 48 may be formed of a resilient material such as stainless steel and aluminum alloy. In the case that the strength of the solid deformation element 46 is sufficient, the arm 44 may be formed from only the solid deformation element 46. As apparent from the various preferred embodiments shown in FIGS. 3 to 5, the arrangement of the solid deformation element according to the present invention is flexible, and it is only necessary to arrange the solid deformation element so that it is operatively related to the arm of the external actuator.

Figure 6:
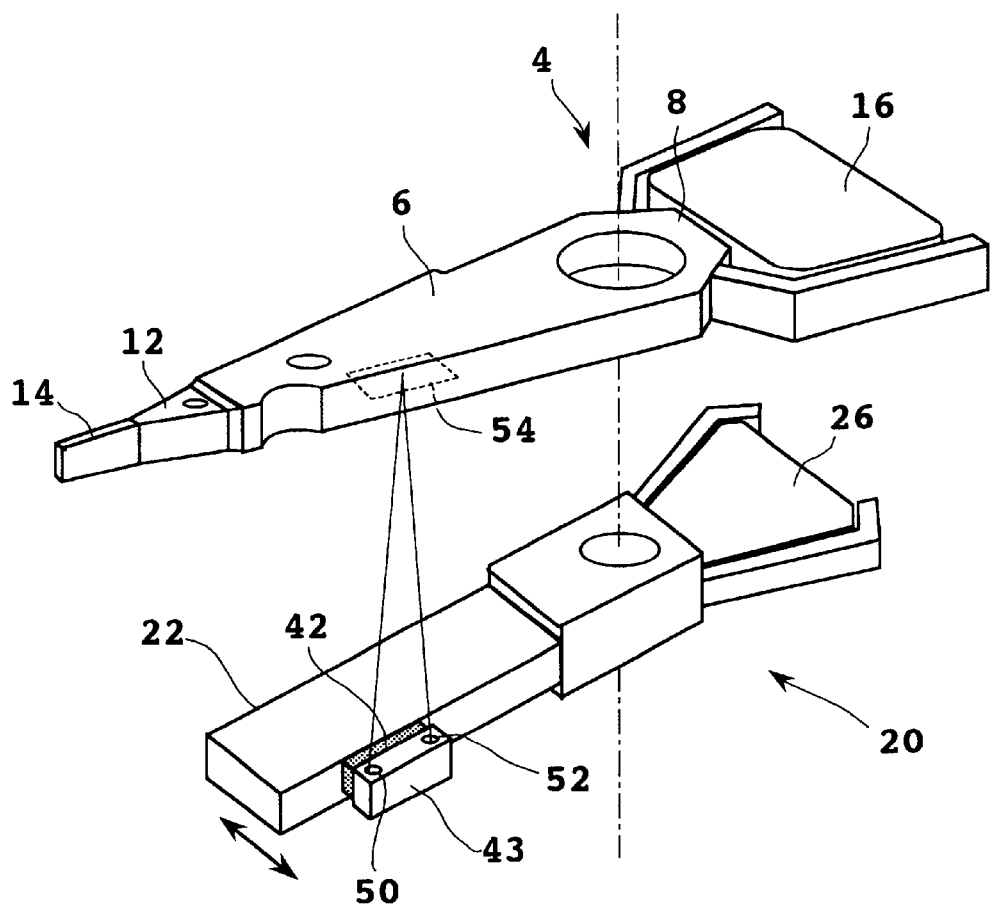
FIG. 6 is a perspective view showing a preferred embodiment adopting noncontact coupling between an arm of an external actuator and a carriage of an internal actuator.

Referring to FIG. 6, there is shown a preferred embodiment adopting noncontact coupling between the arm 22 and the carriage 6. In this preferred embodiment, a block 43 is fixed through the solid deformation element 42 to the arm 22, and a light emitting element 50 and a photodetecting element 52 are mounted on the block 43. A target 54 is mounted on the carriage 6 of the internal actuator 4. A light beam from the light emitting element 50 is directed onto the target 54 and reflected on the target 54. A reflected beam from the target 54 is detected by the photodetecting element 52. With this arrangement, a relative displacement between the arm 22 and the carriage 6 is detected, and all of the external actuator 20, the solid deformation element 42, and the internal actuator 4 are simultaneously driven so as to cancel this relative displacement.

Figure 7:
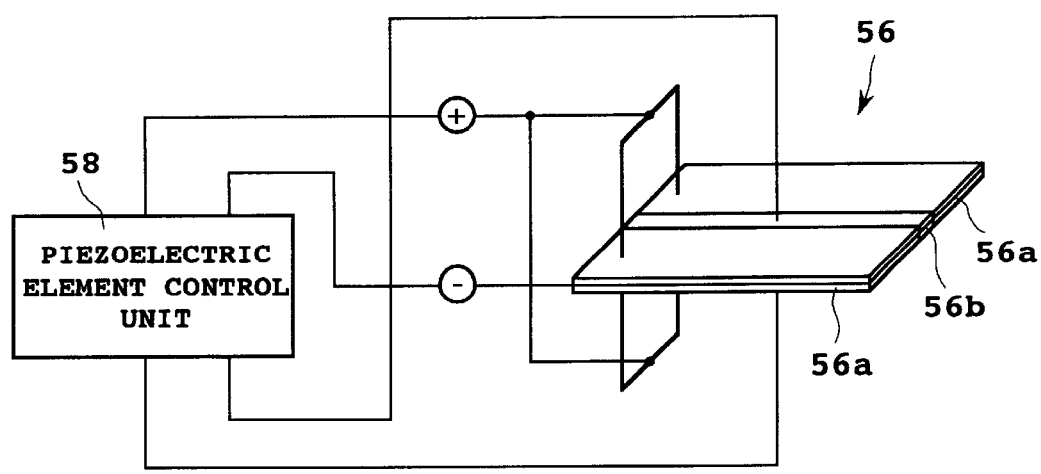
FIG. 7 is a perspective view showing a shear type piezoelectric element as a preferred embodiment of the solid deformation element.

FIG. 7 shows a platelike shear type piezoelectric element 56 as a preferred embodiment of the solid deformation element according to the present invention. The shear type piezoelectric element 56 has a polarization direction along the thickness of plates forming the piezoelectric element 56. The shear type piezoelectric element 56 has a pair of actuator sections 56a and a sensor section 56b interposed between the actuator sections 56a. The actuator sections 56a and the sensor section 56b are connected to a piezoelectric element control unit 58, and controlled by the control unit 58. In the case of using the shear type piezoelectric element 56 as an actuator, a large displacement can be generated, whereas in the case of using the piezoelectric element 56 as a sensor, the sensitivity to an external force can be improved.

Figure 8:
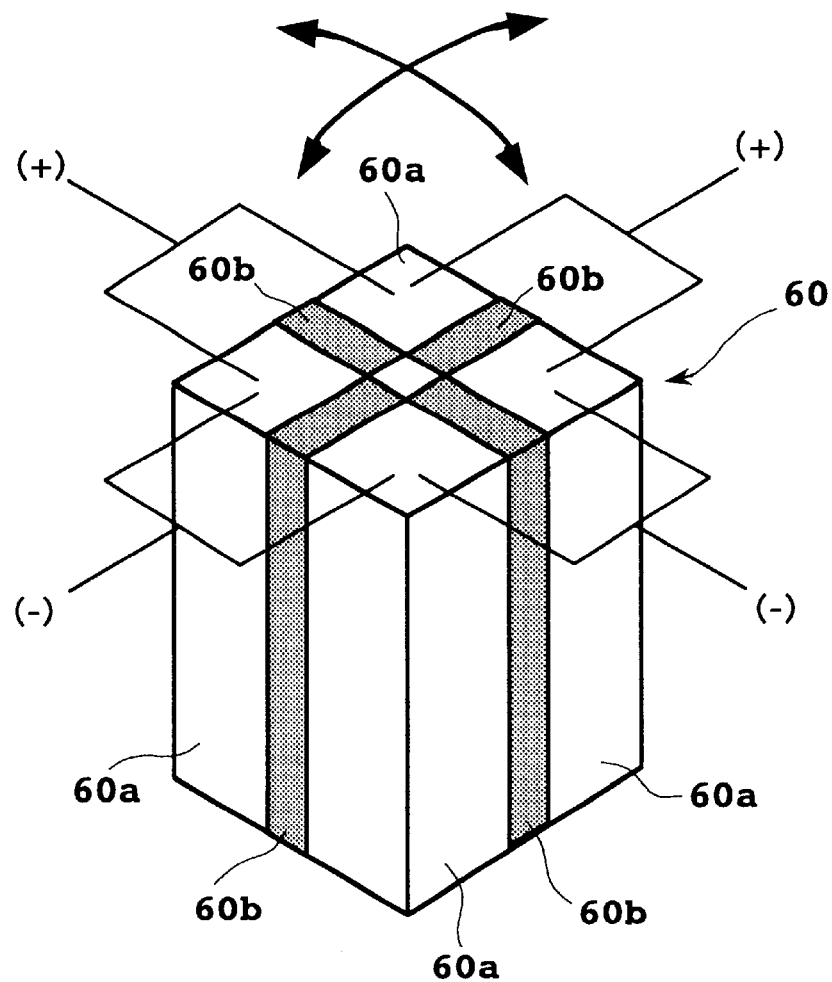
FIG. 8 is a perspective view showing a stack type piezoelectric element as another preferred embodiment of the solid deformation element.

FIG. 8 shows a stack type piezoelectric element 60 as another preferred embodiment of the solid deformation element according to the present invention. The stack type piezoelectric element 60 has a plurality of actuator sections 60a adjacent to each other and a plurality of sensor sections 60b each interposed between any two adjacent ones of the actuator sections 60a. These actuator sections 60a and sensor sections 60b are arranged in two orthogonal directions perpendicular to the direction of stacking of piezoelectric crystals (vertical direction as viewed in FIG. 8). By applying a voltage between the actuator sections 60a opposed to each other as shown and controlling the applied voltage, displacement in various directions can be generated. In the case of using the piezoelectric element 60 as an actuator, the force to be exerted and the responsiveness can be improved, whereas in the case of using the piezoelectric element 60 as a sensor, the sensitivity and responsiveness to displacement can be improved.

Figure 9A:
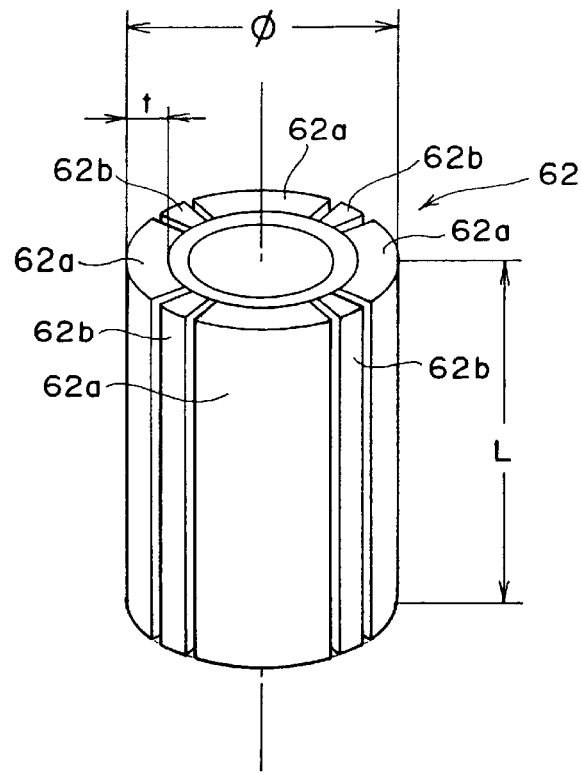
FIG. 9A is a perspective view showing a tubular stack type piezoelectric element as a further preferred embodiment of the solid deformation element.

FIG. 9A shows a tubular stack type piezoelectric element 62 as a further preferred embodiment of the solid deformation element according to the present invention. The piezoelectric element 62 has four actuator sections 62a and four sensor sections 62b alternately arranged in the circumferential direction. That is, the piezoelectric element 62 is circumferentially divided into eight sections. The piezoelectric element 62 is placed so that any one of the sensor sections 62b comes into contact with the carriage 6. With this arrangement, the displacement of the carriage 6 can be detected by the sensor section 62b kept in contact with the carriage 6 and the sensor section 62b radially opposed to the former sensor section 62b, and error displacement in an interference direction can be detected by the remaining two sensor sections 62b.

Figure 9B:
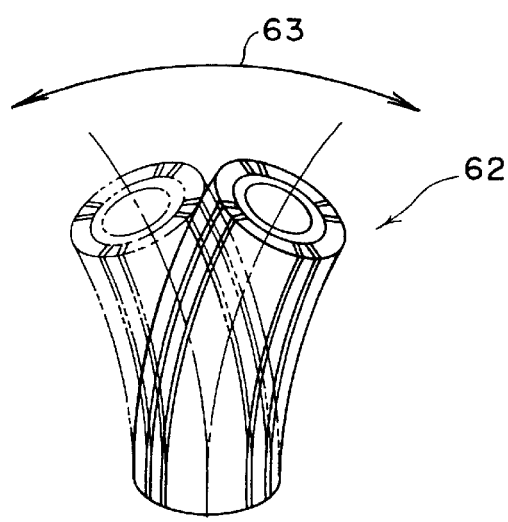
FIG. 9B is a perspective view showing the deformation of the piezoelectric element shown in FIG. 9A.

In the piezoelectric element 62, each sensor section 62b is set smaller than each actuator section 62a, so as to reduce an influence of load rigidity in the piezoelectric element 62 upon each actuator section 62a. By placing the piezoelectric element 62 so that any one of the sensor sections 62b comes into contact with the carriage 6 as mentioned above, and applying a voltage so that the two actuator sections 62a positioned on the carriage 6 side are contracted and the remaining two actuator sections 62a are expanded, the piezoelectric element 62 is deformed toward the carriage 6 to move it, thereby obtaining a positive displacement. On the contrary, by inverting the applied voltage, a negative displacement is obtained. This deformation of the piezoelectric element 62 is shown by an arrow 63 in FIG. 9B.

Although not shown, the piezoelectric element 62 is preferably covered with a casing of metal or resin, so as to improve impact resistance, insulation performance, and weather resistance. Also in the piezoelectric element 62, displacement in various directions can be generated by applying a voltage as in the preferred embodiment shown in FIG. 8 and controlling the applied voltage. In an existing servo track writer, the accuracy of positioning of a head is several nanometers. However, in response to a recent rapid increase in track density, it is considered that a head positioning accuracy on the order of subnanometers will be required after several years.

In the case of setting the dimensions of the tubular piezoelectric element 62 to ø=6 mm (outer diameter), L=10 mm (length), and t=2 mm (thickness), and applying a drive voltage of 100 V, a horizontal displacement of about 1 μm can be generated. Accordingly, when the controlled voltage resolution is 5 mV, a displacement resolution of about 0.05 nm can be ensured. Further, the natural frequency of the piezoelectric element 62 becomes about 10 kHz. These values are sufficient values in consideration of the fact that the track pitch for writing of a servo pattern is about 1 μm and that the natural frequency of the carriage 6 is near 4 kHz. Further, by suitably designing the shape and size of the piezoelectric element 62, the characteristics can also be improved.

Figure 10:
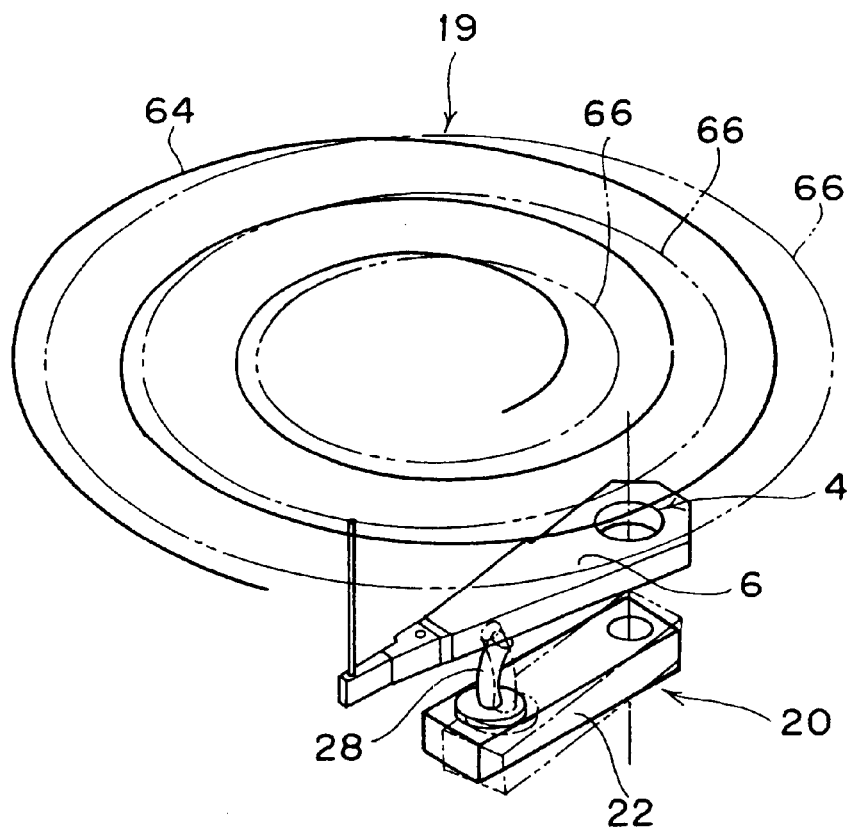
FIG. 10 is a perspective view illustrating a driving method for a servo track writer according to the present invention.
Figure 11A:
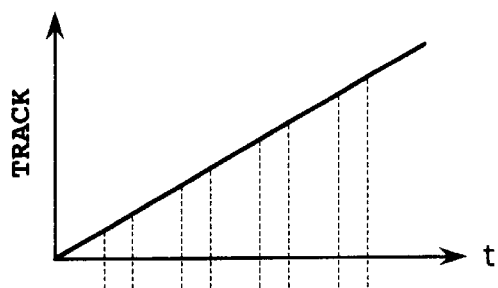
FIG. 11A is a graph showing an absolute orbit of the arm of the external actuator.
Figure 11B:
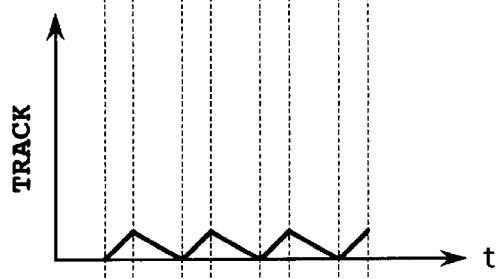
FIG. 11B is a graph showing a relative orbit of the piezoelectric element to the arm.

There will now be described a driving method for a servo track writer according to a preferred embodiment of the present invention with reference to FIG. 10 and FIGS. 11A to 11C. The external actuator 20 drives to move the arm 22 from the outer circumference of the disk medium 19 to the center thereof (or from the center of the disk medium 19 to the outer circumference thereof) at a constant speed in synchronism with the rotation of the disk medium 19 so that the effector 28 fixed to the front end of the arm 22 describes a spiral locus 64 relative to the disk medium 19 as shown in FIG. 10. FIG. 11A shows an absolute orbit of the arm 22 of the external actuator 20. In each of FIGS. 11A to 11C, the horizontal axis represents time, and the vertical axis represents position across the tracks. FIG. 11B shows a relative orbit of the effector 28 to the arm 22, which illustrates that the effector 28 is driven so as to reciprocate relative to the arm 22 moving at a constant speed.

Figure 11C:
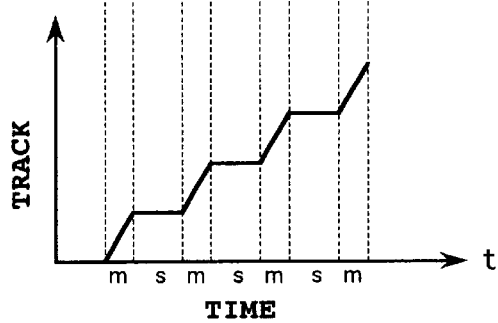
FIG. 11C is a graph showing an absolute orbit of the piezoelectric element, that is, an absolute orbit of the carriage of the internal actuator.

By driving the arm 22 and the effector 28 as mentioned above, the carriage 6 and the head 14 mounted thereon are driven so as to describe concentric circles 66 relative to the disk medium 19. FIG. 11C shows an absolute orbit of the carriage 6, in which m represents a time period of movement of the carriage 6 and s represents a time period of stop of the carriage 6. During the time periods of stop of the carriage 6, concentric servo track patterns are written on the disk medium 19 by the head 14.

In a conventional driving method for a servo track writer, a bias current is applied to an internal actuator to press a carriage against an effector of an external actuator with a constant force. The external actuator drives its arm to move the carriage to a position where a servo track pattern is to be written. In writing the servo track pattern, the driving of the external actuator is stopped to position the arm. Thus, the arm of the external actuator and the carriage of the internal actuator undergo an intermittent operation as a unit. However, the intermittent operation causes vibrations or invites a problem that it is difficult to reduce a settling time (time period for convergence within a permissible settling error).

According to the driving method of the present invention, the arm 22 of the external actuator 20 is continuously moved at a constant speed as shown in FIG. 11A, thereby preventing the occurrence of vibrations due to the intermittent operation of the external actuator as mentioned above. Further, the intermittent operation required for positioning of the carriage 6 to each track is carried out by the solid deformation element having high responsiveness, thereby allowing an improvement in response speed for head positioning in the disk drive.

FIG. 12 is a block diagram showing a servo track writer driving circuit according to a preferred embodiment of the present invention. This driving circuit is composed generally of an external actuator drive unit 70 and a piezoelectric element drive unit 76. The external actuator drive unit 70 includes an arm controller 72, an arm drive circuit 74, an arm 22, and a position detecting section 30. The piezoelectric element drive unit 76 includes a controller 78, a drive circuit 80, a piezoelectric element 62 having an actuator section 62a and a sensor section 62b, and a correction table 82.

A monotonously increasing target position r1 of the arm 22 is applied to the arm controller 72. A error e1 of the position of the arm 22 detected by the position detecting section 30 from the target position r1 is next obtained. The arm controller 72 generates a manipulatated variable u1 according to this error e1, and inputs the manipulatated variable u1 to the arm drive circuit 74. The arm drive circuit 74 drives the arm 22 according to the input manipulatated variable u1. Thus, the external actuator drive unit 70 feedback controls the driving of the arm 22 so that the position of the arm 22 detected by the position detecting section 30 coincides with the target position r1.

In the next step, a target stop position r2 of the carriage 6 is input to a target position of the actuator section 62a of the piezoelectric element 62. A error e2 of the sum of a displacement signal obtained by the sensor section 62b of the piezoelectric element 62 and the arm position detected in the external actuator drive unit 70, from the target stop position r2 is next obtained. The controller 78 generates a manipulatated variable u2 according to the error e2, and inputs the manipulatated variable u2 to the drive circuit 80. The drive circuit 80 drives the actuator section 62a of the piezoelectric element 62 according to the input manipulatated variable u2.

Thus, the piezoelectric element drive unit 76 obtains a carriage position from the sum of the relative position of the piezoelectric element 62 to the arm 22 detected by the sensor section 62b of the piezoelectric element 62 and the arm position detected in the external actuator drive unit 70, and drives the actuator section 62a of the piezoelectric element 62 so that the carriage position obtained above coincides with the target stop position r2. By such control, the results shown in FIGS. 11A to 11C are obtained. The responsiveness of the piezoelectric element 62 is higher than that of the external actuator 20. Therefore, during the movement of the carriage 6 between the tracks, the actuator section 62a of the piezoelectric element 62 is moved in the same direction as the direction of movement of the external actuator 20 to reach the target position earlier.

During the stop of movement of the carriage 6, the actuator section 62a of the piezoelectric element 62 is moved in a direction opposite to the direction of movement of the external actuator 20 to operate in such a manner that the carriage 6 is stopped as viewed in the absolute orbit shown in FIG. 11C. Thus, the coarse operation by the external actuator 20 and the fine operation by the piezoelectric element 62 are combined to thereby allow high-speed movement and low-vibration precise positioning of the carriage 6 and the head 14 in the magnetic disk drive.

In general, a piezoelectric element has hysteresis, and shows linearity when its strain is very small. In this case, a sensor section of the piezoelectric element generates a voltage proportional to the displacement. However, by preliminarily measuring the relation between displacement and voltage to prepare a correction table, and correcting the displacement detected by the sensor section, a hysteresis component can be reduced to thereby ensure sufficient detection and control accuracies. In the block diagram shown in FIG. 12, the displacement detected by the sensor section 62b is corrected by using the correction table 82.

Figure 13:
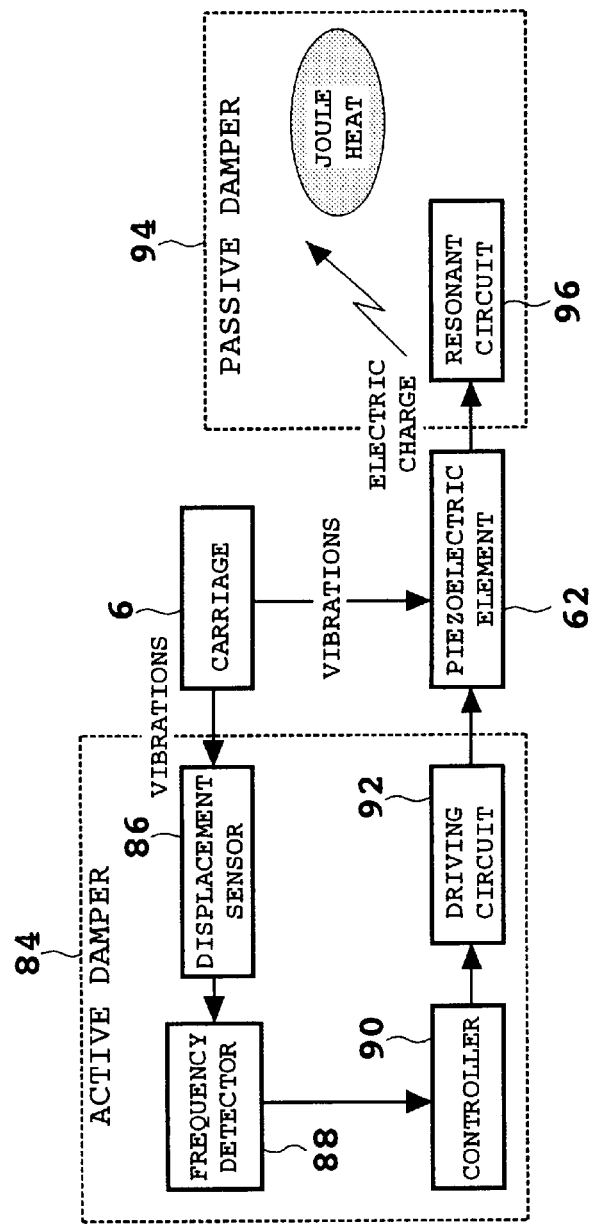
FIG. 13 is a block diagram showing a preferred embodiment adopting a damper for damping the vibrations of the carriage.

Referring to FIG. 13, there is shown a preferred embodiment using the piezoelectric element 62 as a damper. The carriage 6 vibrates because of a disturbance such as rotational vibrations of the spindle motor in the magnetic disk drive, and the effector 28 kept in contact with the carriage 6 also vibrates. The rotational frequency of a spindle motor in a currently dominant magnetic disk drive is about 100 Hz, and the resonant frequency of the carriage 6 and the suspension 12 of the internal actuator 4 is about 4 kHz. The preferred embodiment shown in FIG. 13 is so configured as to reduce these vibrations.

Reference numeral 94 denotes a passive damper configured by a resonant circuit 96 connected to the piezoelectric element 62. Electric charge is generated in the piezoelectric element 62 by the vibrations of the carriage 6. This electric charge is supplied to the resonant circuit 96 to produce Joule heat as a consumption, thereby damping the vibrations of the carriage 6. The frequency characteristic for vibration damping may be varied according to the circuit configuration of the resonant circuit 96. In this preferred embodiment, the frequency characteristic for vibration damping is set to a frequency characteristic of a low-pass filter to damp the resonance of the internal actuator 4 in a frequency range of 3 to 5 kHz.

Reference numeral 84 denotes an active damper including a displacement sensor 86 for detecting the vibrations of the carriage 6, a frequency detector 88, a controller 90, and a drive circuit 92. For example, the displacement sensor 86 is configured by the sensor section 62*b* of the piezoelectric element 62. In operation, the vibrations of the carriage 6 are first detected by the displacement sensor 86. Then, of the vibration frequency components detected by the displacement sensor 86, a particularly large frequency or frequency band is extracted by the frequency detector 88. The controller 90 generates a temporal waveform of opposite phase so as to suppress the vibrations of the above extracted frequency or frequency band. Then, the drive circuit 92 applies a voltage to the actuator section 62*a* of the piezoelectric element 62 according to the above temporal waveform, thereby suppressing the vibrations of the carriage 6.

Also in the active damper 84, the frequency or frequency band to be suppressed can be selected by adjusting the sensitivity of the frequency detector 88. In this preferred embodiment, the frequency detector 88 is configured by a notch filter for suppressing the rotational frequency (about 100 Hz) of the spindle motor in a low-frequency region. Thus, the passive damper 94 operates to damp the resonant frequency (about 4 kHz) of the carriage 6 and the suspension 12, and the active damper 84 operates to damp the rotational frequency (about 100 Hz) of the spindle motor, thereby obtaining a damping effect in a wide frequency band.

Figure 14:
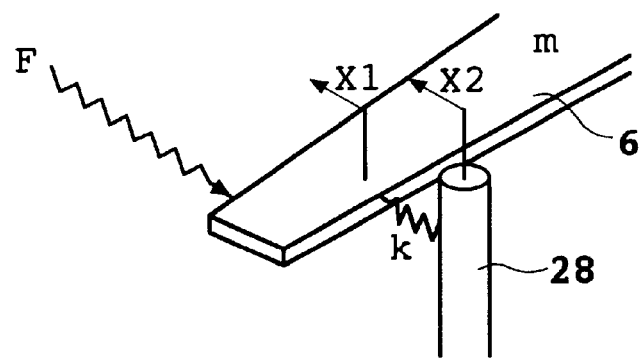
FIG. 14 is a schematic illustration of contact rigidity.

FIG. 14 is a schematic illustration of contact rigidity between the carriage 6 and the effector 28. The contact rigidity is expressed in the following equation.

$$f = k\Delta x \quad (1)$$

where, f: contact force k: contact rigidity

Δx: position error between bodies (x1–x2)

Eq. (1) may be transformed into Eq. (2).

$$\Delta x = f/k \quad (2)$$

That is, the force expressed by Eq. (1) can be converted into the position error expressed by Eq. (2), so that position control can be performed by the use of contact rigidity. By setting k to a desired value, the contact rigidity can be handled as if it were changed.

Figure 15:
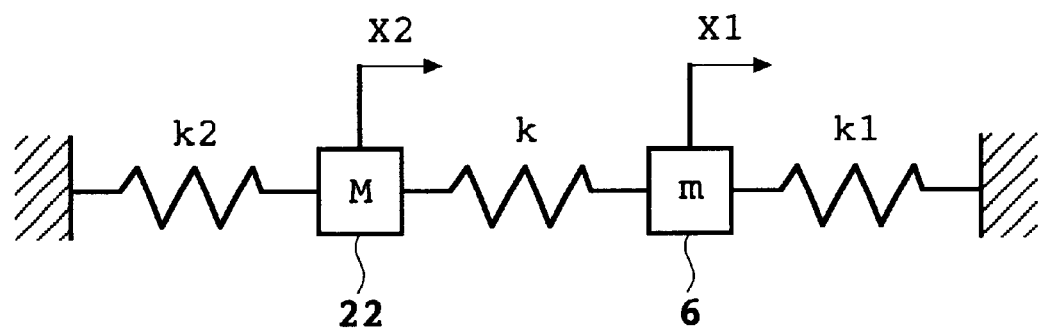
FIG. 15 is a schematic illustration of a mechanical model.

This is modeled as shown in FIG. 15, and the following equations are given.

$$m(d^2x1/dt^2) = -k1 x1 - k(x1-x2) + F \quad (3)$$

$$M(d^2x2/dt^2) = -k(x2-x1) - k2 x2 \quad (4)$$

where k1 is the spring constant of the internal actuator 4, k2 is the spring constant of the external actuator 20, m is the mass of the carriage 6, M is the mass of the arm 22, and F is the disturbance to the carriage 6.

Figure 16:
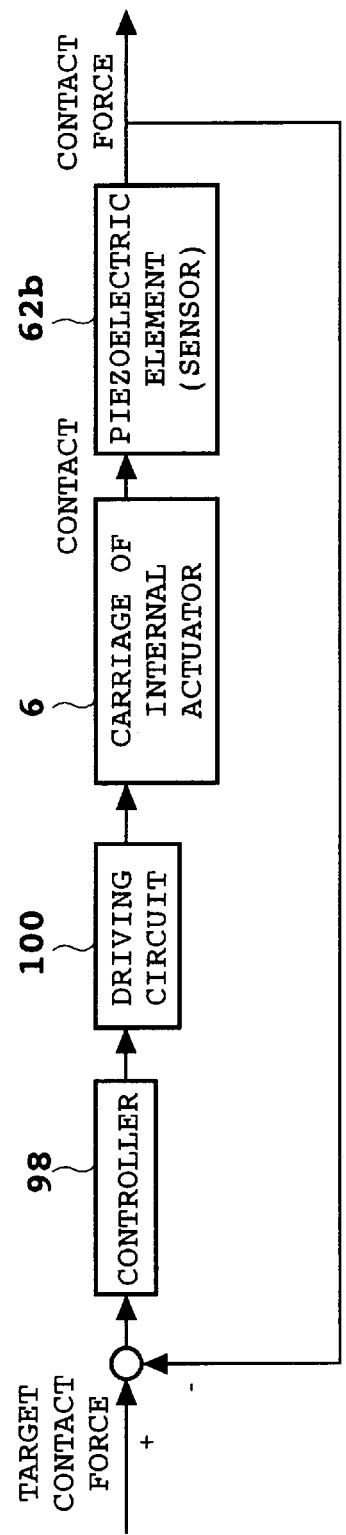
FIG. 16 is a block diagram showing a driving method by force control.

Referring to FIG. 16, there is shown a block diagram of a servo track writer driving method by force control. A target contact force between the carriage 6 and the effector 28 configured by the piezoelectric element 62 is input into a controller 98. Then, the carriage 6 of the internal actuator 4 is driven by a drive circuit 100 according to this target contact force. A contact force between the carriage 6 and the effector 28 is detected by the sensor section 62*b* of the piezoelectric element 62, and this detected contact force is fed back to the controller 98. Then, the controller 98 feedback controls the driving of the carriage 6 so that the detected contact force coincides with the target contact force.

Figure 17:
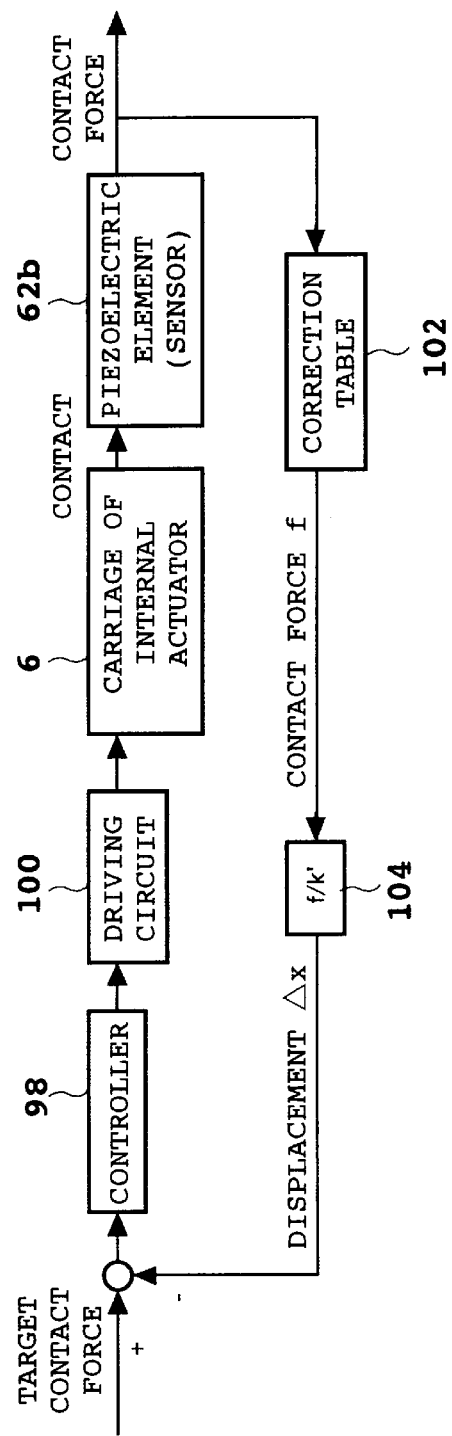
FIG. 17 is a block diagram showing another driving method intended to change the contact rigidity.

Referring to FIG. 17, there is shown a block diagram for changing the contact rigidity. The sensor section 62*b* of the piezoelectric element 62 is in contact with the carriage 6 of the internal actuator 4, and therefore generates a voltage proportional to a contact force between the carriage 6 and the sensor section 62*b*. However, hysteresis exists in the piezoelectric element 62. To cope with this, an output voltage from the sensor section 62*b* of the piezoelectric element 62 is corrected by using a correction table 102 prepared by preliminarily measuring the relation between voltage and force.

A contact force f corrected by the correction table 102 is converted into a displacement Δx from the relation of Δx=f/k' where k' is the spring constant corresponding to a desired resonant frequency. The displacement Δx thus obtained is input to the controller 98 to perform position control of the carriage 6 of the internal actuator 4. By changing the value of the contact rigidity from k to k', the resonant frequency can be changed.

Figure 18A:
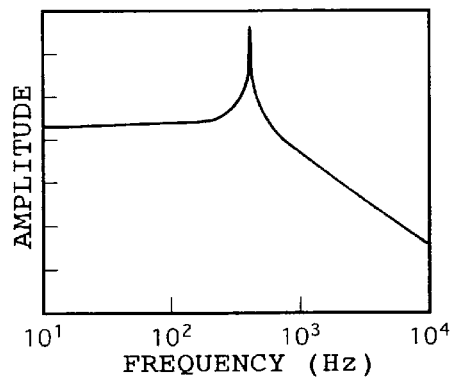
FIGS. 18A to 18D are graphs showing simulation results of resonance frequency adjustment by the change of the contact rigidity.
Figure 18B:
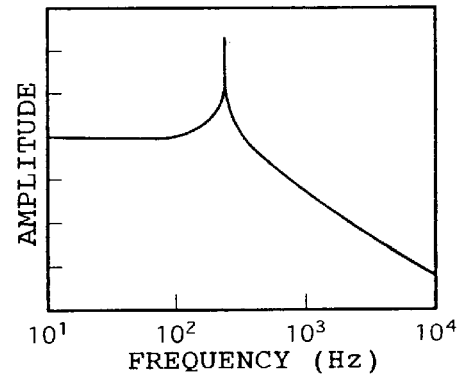
Figure 18C:
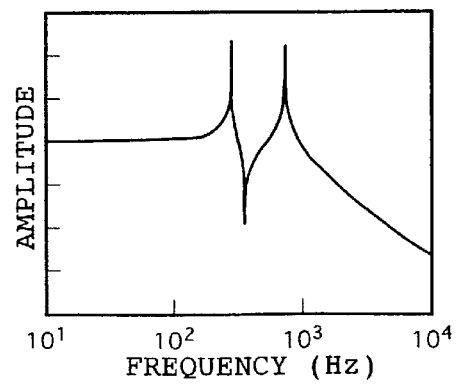
Figure 18D:
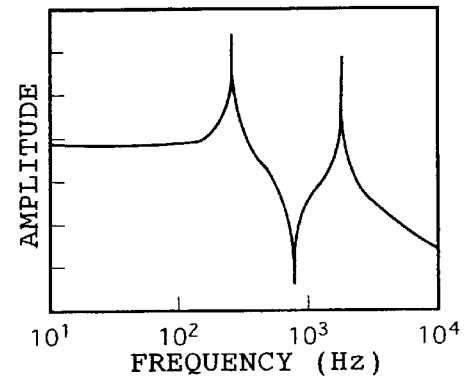

FIGS. 18A to 18D show simulation results of resonant frequency adjustment by the change of the contact rigidity. The simulation was performed on the basis of FIG. 15 and Eqs. (3) and (4). In each of FIGS. 18A to 18D, the horizontal axis represents frequency (Hz), and the vertical axis represents amplitude. FIG. 18A shows a displacement output of m having one degree of freedom in the case that the contact rigidity k is zero, i.e., in the case that the carriage 6 and the arm 22 are not in contact with each other. FIG. 18B shows a displacement output of M having one degree of freedom in the case that the contact rigidity k is zero. FIG. 18C shows a displacement output of m having two degrees of freedom in the case that the contact rigidity k is used to connect m and M. It is understood that the resonant frequency changes with the change from the one-degree-of-freedom system to the two-degree-of-freedom system. FIG. 18D shows a result in the case that the value of the contact rigidity k is increased ten times the value in the case of FIG. 18C.

It is understood from the above simulation results that the resonant frequency can be freely changed by changing the value of the contact rigidity k. Further, by selecting a suitable value of the contact rigidity k providing a suitable resonant frequency in simulation, and applying the selected value of the contact rigidity k to the magnetic disk drive to control the resonant frequency, a suitable vibrated condition as a servo track writer can be obtained also in consideration of the rotational frequency of the spindle motor and the resonance of a mechanical portion.

While a piezoelectric element is used as the solid deformation element in each preferred embodiment mentioned above, a piezoelectric resin such as polyvinylidene fluoride (PVDF), a composite piezoelectric element, or a magnetostrictive element may be used as the solid deformation element. Further, an electrostrictive element may also be used as the solid deformation element under certain conditions. While the output from the sensor section is corrected by using the correction table in the above specific preferred embodiment, no correction table is required by using $Pb(Mg_{1/3}Nb_{2/3})O_3$ (PMN) or a single crystal of lithium niobate ($LiNbO_3$). Further, by preliminarily making a correction table in relation to applied voltage and displacement, open-loop control may be adopted as the drive control for the solid deformation element. The open-loop control can be performed without the use of a sensor by using an electrostrictive element such as PMN or a single crystal of lithium niobate ($LiNbO_3$) having good linearity.

The solid deformation element is not limited to a tubular type as in the specific preferred embodiment, but various types including unimorph, bimorph, multimorph, stack, honeycomb, and cubic tripod types may be used according to uses. While the solid deformation element in each preferred embodiment is divided into an actuator section and a sensor section, a solid deformation element having no sensor section may be used and the deformation of this solid deformation element may be detected by using a strain gauge or the like. Further, a noncontact sensor of various types such as laser, eddy current, and electrostatic capacity types may be used as the sensor.

According to the present invention as described above, it is possible to provide a servo track writer and a driving method therefor which can improve a head positioning accuracy and positioning response speed in a disk drive. Further, it is possible to reduce the vibrations of the internal actuator in the disk drive in driving the servo track writer due to a disturbance and vibrations generated in the disk drive itself. Further, it is possible to adjust the resonant frequency of the internal actuator in driving the servo track writer without changing the rotational speed of a disk medium, thereby reducing the resonance of the internal actuator depending on the rotational speed of the disk medium.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A servo track writer for writing a servo track signal to a disk medium in a disk drive including said disk medium, a head for reading/writing information from/to said disk medium, and an internal actuator for moving said head across tracks formed on said disk medium, said internal actuator having a rotatable carriage for supporting said head, said servo track writer comprising:

an external actuator having an arm having substantially the same rotational axis as that of said carriage, a drive unit for rotating said arm, a solid deformation element provided in relation to said arm, and an effector mounted on said arm and adapted to come into contact with said carriage;

an internal actuator control unit for controlling said internal actuator;

an external actuator control unit for controlling said external actuator;

a solid deformation element control unit for controlling said solid deformation element;

an arm position detecting device for detecting a position of said arm; and said solid deformation element being divided into at least a first segment and a second segment, said first segment functioning as an actuator for minutely displacing said carriage, said second segment functioning as a sensor for detecting a position of said effector.

2. A servo track writer according to claim 1, wherein said solid deformation element is selected from the group consisting of a piezoelectric element, piezoelectric resin, composite piezoelectric element, magnetostrictive element, and electrostrictive element.

3. A servo track writer according to claim 1, wherein said effector is configured by said solid deformation element.

4. A servo track writer according to claim 1, wherein said solid deformation element is interposed between said arm and said effector.

5. A servo track writer according to claim 1, wherein at least a part of said arm is configured by said solid deformation element.

6. A servo track writer according to claim 1, wherein said solid deformation element comprises a tubular stack type solid deformation element divided into a plurality of first segments and a plurality of second segments alternately arranged in the circumferential direction.

7. A servo track writer according to claim 1, wherein said solid deformation element comprises a shear type solid deformation element having a polarization direction along the thickness thereof and divided into a pair of first segments and a second segment interposed between said pair of first segments.

8. A driving method for a servo track writer having an arm having substantially the same rotational axis as that of a carriage in a disk drive, a drive unit for rotating said arm, a solid deformation element provided in relation to said arm, and an effector mounted on said arm and adapted to come into contact with said carriage, said driving method comprising the steps of:

driving said carriage so that said carriage and said effector come into contact with each other;

inputting an arm target position command to rotate said arm;

detecting a position of said arm;

feedback controlling the rotation of said arm so that said detected position of said arm coincides with an arm target position;

inputting a carriage target position command to drive a first part of said solid deformation element and to minutely move said carriage through said effector;

detecting a relative position of said effector to said arm by using a second part of said solid deformation element;

detecting a position of said carriage according to said detected position of said arm and said detected relative position of said effector; and feedback controlling the driving of said first part of said solid deformation element so that said detected position of said carriage coincides with a carriage target position.

9. A driving method according to claim 8, wherein:

said arm is rotated so that said effector describes a spiral locus relative to a disk medium rotating at a constant speed; and said solid deformation element drives said effector so that said carriage describes a circular locus at each servo track position on said disk medium in synchronism with said spiral locus.

10. A driving method according to claim 8, further comprising the steps of:

detecting vibrations of said carriage by using said second part of said solid deformation element; and driving said first part of said solid deformation element in a direction of canceling said detected vibrations of said carriage.

11. A driving method according to claim 8, further comprising the steps of:

accumulating vibrations of said carriage as electric charge in said second part of said solid deformation element; and supplying said electric charge to a resonant circuit connected to said second part of said solid deformation element to consume said electric charge as Joule heat.

12. A driving method according to claim 8, wherein:

said carriage is driven so that a contact force between said carriage and said effector is maintained constant, thereby reducing vibrations generated in said carriage.

13. A driving method according to claim 12, further comprising the step of changing the contact force between said carriage and said effector to thereby change a resonant frequency of said carriage.

* * * * *